March 10, 1970     B. E. DOUDA     3,499,385
AIRCRAFT PARACHUTE FLARE
Filed Feb. 12, 1968
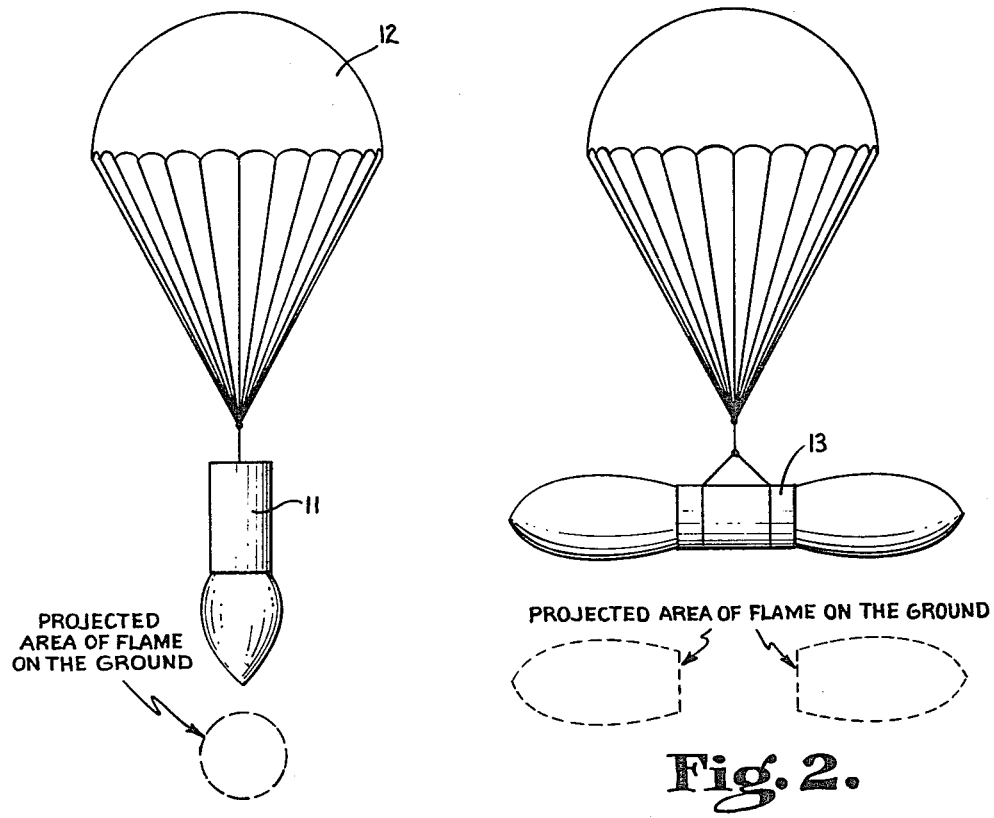
Fig. 1. (Prior Art)
Fig. 2.
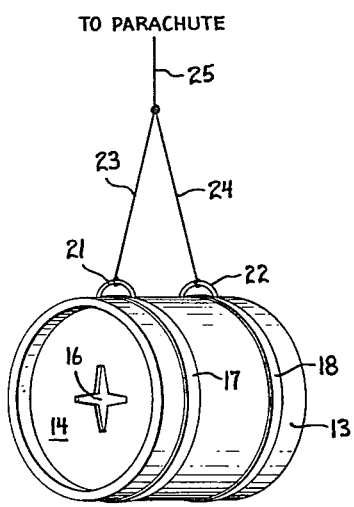
Fig. 5.
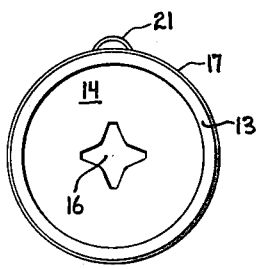
Fig. 3.
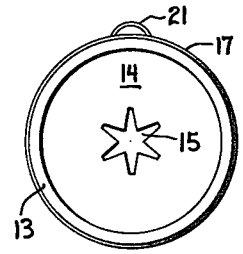
Fig. 4.
INVENTOR.
BERNARD E. DOUDA
Attorneys 3,499,385
AIRCRAFT PARACHUTE FLARE
Bernard E. Douda, Bloomfield, Ind., assignor to the United States of America as represented by the Secretary of the Navy
Filed Feb. 12, 1968, Ser. No. 704,745
The portion of the term of the patent subsequent to Nov. 18, 1985, has been disclaimed
Int. Cl. F42b 25/04; C06d 1/10
U.S. Cl. 102—35
1 Claim

ABSTRACT OF THE DISCLOSURE

An aircraft parachute flare comprising a cylindrical casing having pyrotechnic material with a central cavity therethrough and having at least two supporting bands around said cylindrical casing for attaching said flare to a parachute whereby upon descent of said parachute the longitudinal axis of said central cavity is disposed parallel to the ground.

---

The invention described herein may be manufactured and used by or for the Government of the United States of America for governmental purposes without the payment of any royalties thereon or therefor.

Cross-references to related applications (a) Application of Bernard E. Douda, Ser. No. 657,726, filed July 31, 1967, entitled "Illuminating Flare Composition," now issued as U.S. Patent 3,411,963.

(b) Application of Bernard E. Douda, Ser. No. 657,727, filed July 31, 1967, entitled "Illuminating Flare Composition," now issued as U.S. Patent 3,411,964.

Background of the invention

The present invention relates to a pyrotechnic flare and more particularly to a flare that is to be dropped by parachute from an aircraft for the purpose of illuminating targets or areas.

Various pyrotechnic devices have heretofore been used, particularly by the military forces for illuminating devices. These devices are designed to be launched or dropped from aircraft and many are provided with time fuzes which control their functioning at a predetermined distance from the launching aircraft.

One widely used military flare, aircraft parachute flare, Mk 24, is an aluminum encased, parachute-suspended device which is equipped with variable-delay fuzes. Each flare is capped at its fuze end with a plastic weather cap under which are two fuze dials and a flexible stainless steel lanyard. One fuze dial is used for selecting ejection delays and the other dial is used for selecting ignition delays. After the fuzes are set and a safety pin has been removed, a 12-pound pull on the lanyard initiates flare function thereby permitting a spring-loaded striker to come into contact with a precussion primer in the base of the plunger housing. The primer ignites black powder in the plunger. which is pointed on the end opposite the primer. Holes around the point permit emission of flame from the black powder. The plunger point is driven into the ejection time delay fuze at a position determined by the ejection dial setting. At the end of the preset delay, the ejection time fuze ignites the ejection disc which ejects the parachute assembly, the candle, and the ignition fuze assembly. The ejection disc also ignites the ignition powder which, in turn ignites the black powder in the ignition plunger, forcing the plunger into the ignition time delay fuze at a position determined by the ignition dial setting. Upon ejection, the parachute opens to suspend the candle and the ignition fuze assembly. At the end of the preset ignition delay, the ignition fuze ignites the ignition disc which ignites the first-fire composition. The first-fire composition finally ignites the candle to produce the desired illumination during suspension.

All heretofore known aircraft parachute flares which are used by military forces, burn with their ignited end pointing downward. In this burning position, the flame does not ignite the parachute and also the flare points in the direction of the ground or sea to illuminate targets or areas.

Summary of the invention

The present invention relates to a pyrotechnic candle that is cylindrical in shape and has an internal cavity which extends the entire length of the candle. By way of example, the cavity might be in the shape of a cross of a six-pointed star. The pyrotechnic candle is ignited inside the cavity and, upon burning, a pressure cavity is formed and this pressure causes flames to spew out both ends of the candle a great distance. The candle is supported from the parachute so that its longitudinal axis is parallel to the ground and thus the distance that the flame extends from the end of the candle determines the size of the area which is illuminated below.

Brief description of the drawing

FIGURE 1 is a diagrammatic view showing the prior art method of dropping a flare by parachute;

FIGURE 2 is a diagrammatic view showing a pyrotechnic candle burning at both ends and being suspended from a parachute;

FIGURE 3 is a end view of a pyrotechnic candle having a cross-shaped cavity;

FIGURE 4 is an end view of a pyrotechnic candle having a star-shaped cavity; and FIGURE 5 is a perspective view of a pyrotechnic candle having a suspension harness.

Description of the preferred embodiment

Referring first to FIGURE 1 of the drawing, there is shown a pyrotechnic candle 11 which is suspended in a customary manner from a parachute 12 such that the candle end which is burning is directed toward the ground. It can be seen that the area of illumination on the ground is determined by the diameter of the flame area rather than the distance which the flame spews out from the candle.

Referring now to FIGURES 2 through 5 of the drawing, there is shown a cylindrical container 13 in which a quantity of pyrotechnic composition 14 is packed with a central cavity extending completely through the pyrotechnic composition. FIGURE 4 shows the cavity to be of a star-configuration 15, and FIGURES 3 and 5 of the drawing show a cross-shaped configuration 16. By way of example, pyrotechnic composition 14 might be of the type described in either U.S. Patent No. 3,411,963 or 3,411,964, both of which issued Nov. 19, 1968, to Bernard E. Douda.

In U.S. Patent No. 3,411,963, there is described an illuminating flare composition comprised essentially of a mixture of between 42 and 62 percent magnesium, between 28 and 40 percent sodium nitrate, and between 2 and 18 percent of a binder mix comprised of an epoxy resin and perchlorate-modified amine-terminated long chain polyglycol. The preferred binder mixture is 38 percent epoxy resin and 62 percent polyglycol resin.

In U.S. Patent No. 3,411,964, there is described an illuminating flare composition comprised of magnesium, sodium nitrate and a silicone resin binder which is a complex mixture of organo-polysiloxanes having the organic groups of menthyl, phenyl and vinyl radicals attached to the silicon atoms. The silicon resin can be obtained from the Dow Corning Corporation, Midland, Mich., under the trade name Sylgard 182. The silicone resin binder is compatible with magnesium and sodium nitrate and after polymerization the resin is durable, tough and relatively insensitive to drop, friction, and electrostatic energy.

Referring particularly to FIGURES 3, 4, and 5, of the drawing, a pair of suspension straps 17 and 18 encompass cylindrical container 13, and rings 21 and 22 are attached, respectively, to straps 17 and 18. A pair of suspension lines 23 and 24, which might be rope, cable, chain, or the like, have one end attached to rings 21 and 22, respectively, with the other ends being connected to line 25 which attach to the lines of a parachute.

The following are examples of candles made and used according to the principles of the present invention.

EXAMPLE 1

| | Percent |
|---|---|
| Magnesium (granulation 17) | 58.4 |
| Sodium nitrate (150 microns) | 28.8 |
| Resin mix (Sylgard 182 and catalyst) | 12.8 |

The magnesium particles were of granulation 17, as defined in the Mil-Spec JAN-M-382, entitled. "Magnesium Powder for use in Ammunition." The silicone resin and catalyst were first preblended and then mixed with the magnesium. This mixture was then blended and finally the sodium nitrate was added, and then the mixture was blended until a homogeneous mix was obtained. The mixture was then cast to form a solid candle 16 inches in diameter and 13.5 inches in height. The weight of the candle was 56,750 g. The candle was burned with the following results:

| | |
|---|---|
| Burning time | 65.65 secs. |
| Burning rate | 864.4 g./secs. |
| Candlepower | $2.31 \times 10^6$. |

EXAMPLE 2

| | Percent |
|---|---|
| Magnesium (granulation 15) | 58.4 |
| Sodium nitrate (150 microns) | 28.8 |
| Resin mix (Sylgard 182 and catalyst) | 12.8 |

The ingredients were mixed as in Example 1 and then case to form a candle 16 inches in diameter and 11.75 inches in height. A six-inch star cavity was formed in one end at a depth of 4.5 inches. The weight of the candle was 56,750 g. The candle was burned with the following results:

| | |
|---|---|
| Burning time | 47 secs. |
| Burning rate | 1207 g./secs. |
| Candlepower | $14.9 \times 10^6$. |

In comparing the burning rates of Examples 1 and 2, it can be seen that the cavity design in the candle permits a large mass of pyrotechnic composition to be burned very fast, and it is this fast burning rate that produces the high candlepower output. When the flare is ignited in the cavity, the flare burns from the inside to the outside and a large surface area of composition is burned rapidly. The cavity in the flare forms a pressure cavity and, as the flare burns internally, there is a build-up of pressure which causes the flame to spew out for a great distance from the flare.

EXAMPLE 3

| | Percent |
|---|---|
| Magnesium (granulation 15) | 54.4 |
| Sodium nitrate (150 microns) | 31.2 |
| Resin mix (Sylgard 182 and catalyst) | 14.4 |

The ingredients were mixed as in Example 1 and then cast to form a solid candle 16 inches in diameter and 12 inches in height. The weight of the candle was 56,750 g. The candle was burned with the following results:

| | |
|---|---|
| Burning time | 81 secs. |
| Burning rate | 700 g./secs. |
| Candlepower | $8.3 \times 10^6$. |

EXAMPLE 4

| | Percent |
|---|---|
| Magnesium (granulation 15) | 56.8 |
| Sodium nitrate (150 microns) | 28.8 |
| Resin mix (Sylgard 182 and catalyst) | 14.4 |

The ingredients were mixed as in Example 1 and then cast to form a candle having a six-inch cavity as shown in FIGURE 3 of the drawing. The candle was 16 inches in diameter, 18 inches in length, and the cavity extended through the entire length of the candle. The weight of the candle was 56,750 g. and the candle was burned with the following results:

| | |
|---|---|
| Burning time | 36.14 secs. |
| Burning rate | 2260 g./secs. |
| Candlepower | $25.7 \times 10^6$. |

In comparing the burning rates of the candles of EXAMPLES 3 and 4, it can be seen that the burning rate of the candle having the through cavity is more than three times greater than the burning rate of the solid candle. The solid candle produced a flame length of 12.3 feet while the cavity candle of Example 4 produced two flames of 22.5 feet and 17.25 feet in length. The projected flame surface area of the candle of Example 3 was 73 square feet and the total projected flame area of the candle of Example 4 was 168.6 square feet. Comparison of the candles of Examples 3 and 4 show that the luminous intensity varies directly with the length of flame.

A pyrotechnic candle having a cavity extending the entire length will, when ignited, burn at both ends, and the thrust resulting from each of two horizontally opposed flames will tend to counterbalance one another. On the other hand, a pyrotechnic candle burning at only one end will provide a thrust which will tend to propel the candle in an opposite direction.

In operation, the flare and parachute are launched from an aircraft in a conventional manner, however, after the parachute is deployed, the longitudinal axis of the cylindrical container 13 is positioned parallel with the ground. As the flare burns internally, there is a build-up of pressure in the cavity which causes the flame to spew out for a great distance from the flare and a large surface area of the flame is projected on the ground.

I claim:
1. An aircraft parachute flare comprising:
   a parachute,
   a container,
   a quantity of illuminating flare composition comprised of between 54 and 64 percent of magnesium, between 28 and 38 percent of sodium nitrate, and between 3 and 15 percent of a resin binder selected from the group consisting of silicone resin, and a resin binder comprised of an epoxy resin and a perchlorate-modified amine-terminated long chain polyglycol resin said flare composition being cast within said container and having a central cavity therethrough whereby upon ignition a flame is expelled from both ends of said container,
   at least two supporting straps encompassing said container, and
   suspension means connecting said supporting straps to said parachute whereupon deployment of said para- chute said container is supported with its longitudinal axis parallel to the ground.

References Cited

UNITED STATES PATENTS

| | | | |
|---|---|---|---|
| 1,832,855 | 11/1931 | Bok | 102—35 |
| 2,044,024 | 2/1934 | Wiley | 102—35.2 |
| 2,700,603 | 2/1955 | Hart et al. | 149—43 |
| 3,083,526 | 4/1963 | Hudson | 149—61 X |
| 3,309,249 | 3/1967 | Allen | 149—43 X |
| 3,411,963 | 11/1968 | Douda | 149—19 |
| 3,411,964 | 11/1968 | Douda | 149—19 |
| 3,432,370 | 3/1969 | Bash et al. | 149—43 |

FOREIGN PATENTS

| | | |
|---|---|---|
| 509,207 | 7/1939 | Great Britain. |
| 548,963 | 10/1942 | Great Britain. |

OTHER REFERENCES

Vogel: Jet Propulsion, February 1956, pages 102–105.

ROBERT F. STAHL, Primary Examiner